United States Patent
Li et al.

(10) Patent No.: US 7,097,338 B2
(45) Date of Patent: Aug. 29, 2006

(54) FRAME STRUCTURE USED IN A BACKLIGHT MODULE

(75) Inventors: Szu-Han Li, Jhongli (TW); Yung-Pin Chuang, Pingtung (TW); Li-Huang Lu, Jhongli (TW); Deng-Kuen Shiau, Gongliao (TW)

(73) Assignee: Quanta Display Inc., Tao Yuan Shien (TW)

( * ) Notice: Subject to any disclaimer, the term of this patent is extended or adjusted under 35 U.S.C. 154(b) by 0 days.

(21) Appl. No.: 11/392,589

(22) Filed: Mar. 30, 2006

(65) Prior Publication Data

US 2006/0171172 A1    Aug. 3, 2006

Related U.S. Application Data

(63) Continuation of application No. 10/841,643, filed on May 10, 2004.

(30) Foreign Application Priority Data

Dec. 3, 2003    (TW) .............................. 92134267 A

(51) Int. Cl.
*G02F 1/1333*    (2006.01)
(52) U.S. Cl. ........................ 362/561; 362/633; 349/58

(58) Field of Classification Search ................ 362/559, 362/561, 632–634; 349/58–60
See application file for complete search history.

(56) References Cited

U.S. PATENT DOCUMENTS

| 4,772,100 A | 9/1988 | Suenaga .................... 349/58 |
| 6,339,457 B1 | 1/2002 | Won ............................ 349/58 |
| 6,667,780 B1 | 12/2003 | Cho ........................... 349/58 |

FOREIGN PATENT DOCUMENTS

| JP | 60057280 A | 4/1985 |
| JP | 63179322 A | 7/1988 |
| JP | 05053131 A | 3/1993 |

*Primary Examiner*—Renee Luebke
*Assistant Examiner*—Robert May
(74) *Attorney, Agent, or Firm*—Bacon & Thomas, PLLC

(57) ABSTRACT

A frame structure used in a backlight module is disclosed. The frame structure includes an upper frame and a lower frame. By combining the T-shape hook of the upper frame and the corresponding groove of the lower frame, the components of the backlight module, such as the linear light source, the light source fixer, the light guide, the upper diffusing plate, the reflective plate, the lower diffusing plate, and the prism plate can be well assembled. Therefore, an improved positioning and fixing efficacy is provided.

4 Claims, 8 Drawing Sheets

FRAME STRUCTURE USED IN A BACKLIGHT MODULE

This application is a continuation application of U.S. Ser. No. 10/841,643, filed May 10, 2004.

BACKGROUND OF THE INVENTION

1. Field of the Invention

The present invention relates to a frame structure used in a backlight module and, more particularly, to a frame structure for fixing the components of a backlight module for illuminating a liquid crystal panel.

2. Description of Related Art

In recent years, the liquid crystal display device has been commonly applied in the information technologies. In particular, owing to the mature manufacturing technique, the price of the liquid crystal display device has become cheaper, which also further benefits the popularity of the liquid crystal display device.

Generally speaking, displaying method of the liquid crystal display device is passive, which means that there must be a backlight module to illuminate the liquid crystal panel, and thereby the images displayed on the liquid crystal display device can be seen. Therefore, the liquid crystal display device must be mounted with a backlight module. As shown in FIG. 1, the liquid crystal display device is composed of several minute and complex elements. Commonly, a liquid crystal panel 4 as well as the components of a backlight module, e.g. a linear light source 6, a light source fixer 9, a light guide 12, an upper diffusing plate 13, a prism plate 14, a reflective plate 15, and a lower diffusing plate 16, are assembled between an outer frame 5 and a lower frame 2. The outer frame 5 is made of metal and optionally combined with a plastic upper frame 1, and the lower frame 2 is made of metal or plastic. Among those elements, the lower frame 2 is made of metal or plastic. Among those elements, the assembling frames, i.e. the outer frame 5, the upper frame 1, and the lower frame 2 must have good fixing ability and assembling characteristics.

U.S. Pat. No. 5,729,310 disclosed a lighting apparatus, which fixed the upper frame to the lower frame by at least a pair of protrusions produced on one of the upper and lower frames and a recess formed on the other frame to engage with the protrusions. Commonly, the recess for engaging the protrusion has excess space in order to facilitate the engagement. However, the space might lead to a loose engagement between the protrusion and the recess, and make the fixing between the upper and lower frames not firm enough.

Currently, the backlight module utilizes an upper frame A and a lower frame B to receive the components of a backlight module, as shown in FIG. 2. The upper frame A has a plurality of square buckling elements a, which can buckle with the protruding elements b formed at the periphery of the lower frame B for fixing the upper frame A to the lower frame B. Similarly, the upper frame A has to include a gap c for facilitating the buckling between the square buckling elements a—and the protruding elements b, as shown in FIG. 3. As a result, the fixing efficiency is compromised.

Thus, no matter whether the protrusion or the square buckling element is used, it can restrain the relative movement between the upper and lower frames in the upright direction, but it cannot restrain the relative movement between the upper and lower frames in the cross direction effectively. Consequently, the assembling frame of the backlight module currently used cannot provide an effective fixing function.

Therefore, it is desirable to provide an improved frame structure used in a backlight module to mitigate and/or obviate the aforementioned problems.

SUMMARY OF THE INVENTION

The object of the present invention is to provide a frame structure used in a backlight module so that all the components of the backlight module can be well positioned and fixed, and the fixing efficacy thereof is improved.

Another object of the present invention is to provide a frame structure used in a backlight module so that the quantity of hooking elements, the weight, and the manufacturing cost of the frame are reduced.

To achieve the object, the frame structure used in a backlight module of the present invention includes a lower frame for holding components of the backlight module and an upper frame mounted on the lower frame for assembling the components of the backlight module; wherein the upper frame has at least one hooking element, which restrains the movements of the components of the backlight module in both cross and upright directions simultaneously, and the lower frame has at least one corresponding engaging element that can engage with at least one hooking element.

Other objects, advantages, and novel features of the invention will become more apparent from the following detailed description when taken in conjunction with the accompanying drawings.

DETAILED DESCRIPTION OF THE PREFERRED EMBODIMENT

Example 1

Figure 1:
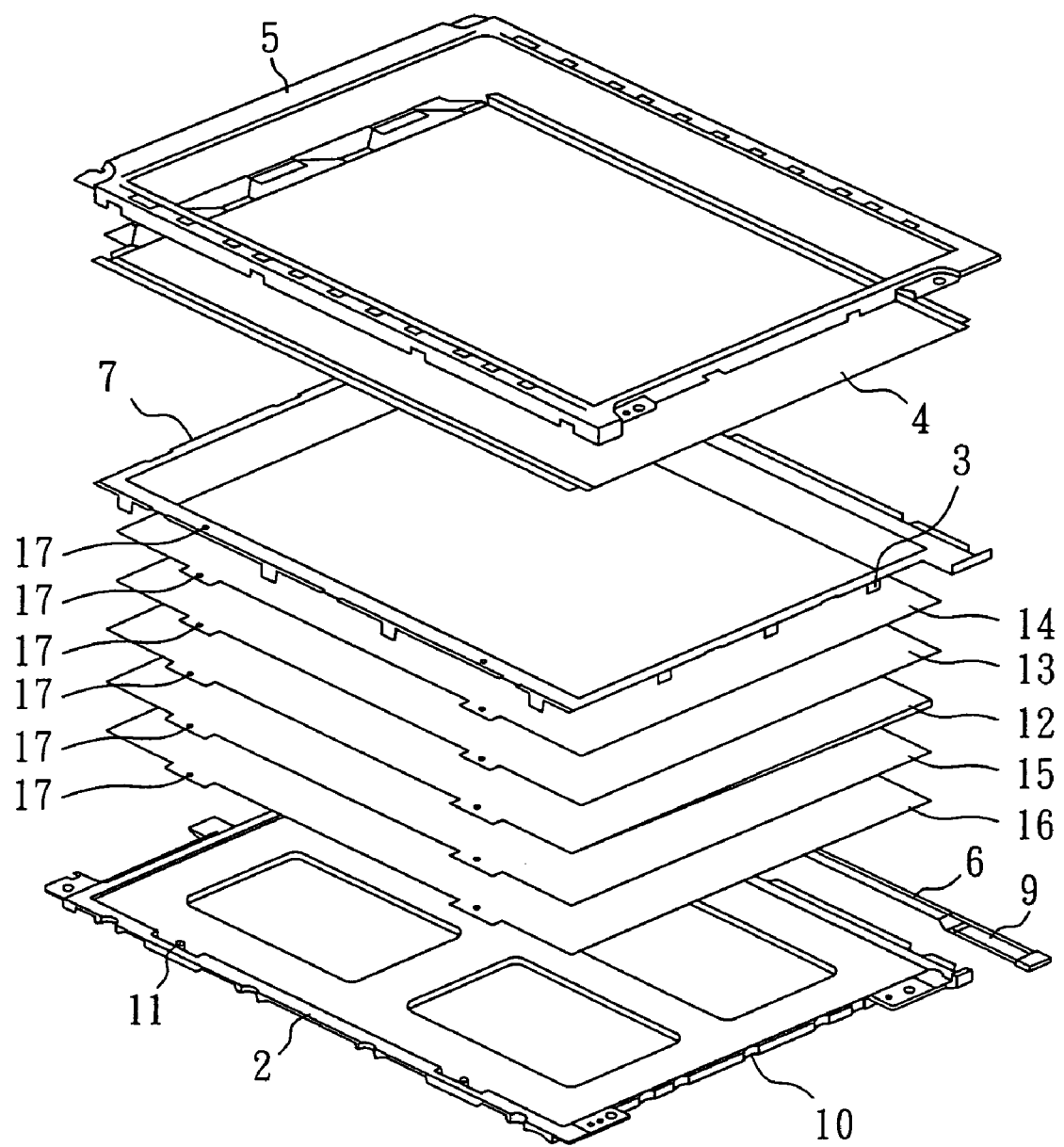
FIG. 1 is a perspective view showing the liquid crystal display device of the prior art.
Figure 2:
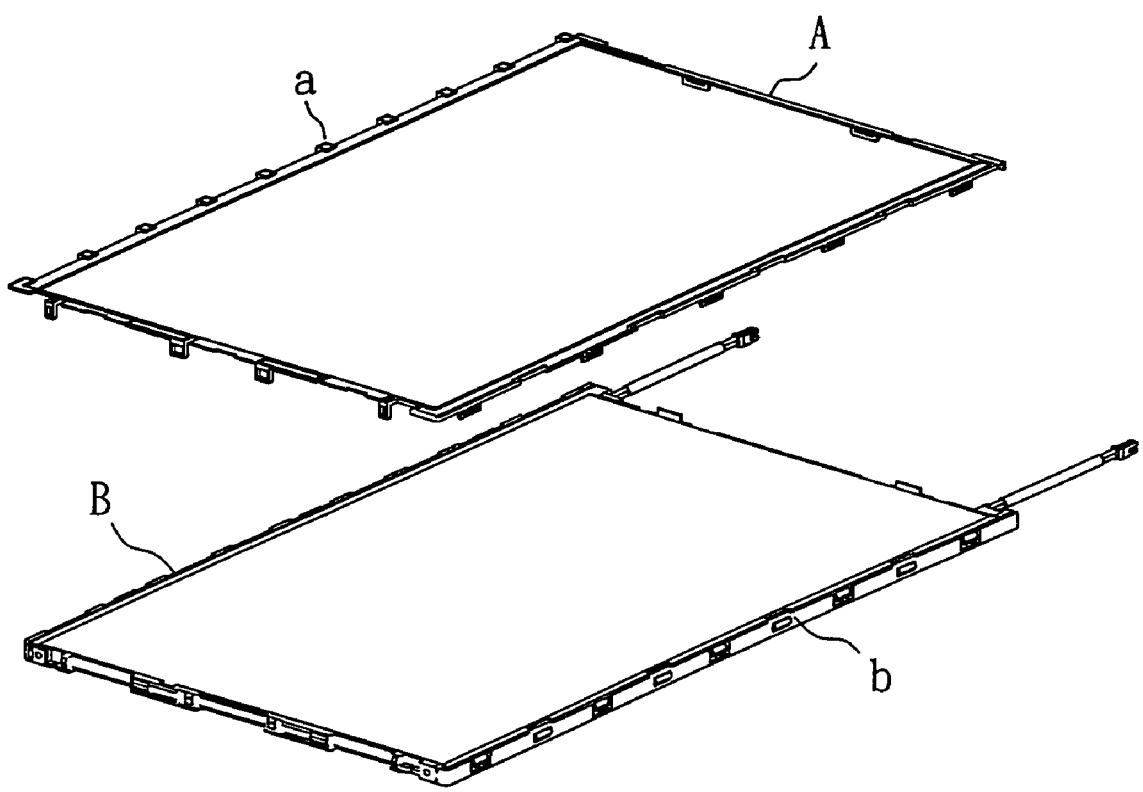
FIG. 2 is a perspective view showing the upper frame and the lower frame of the prior art.
Figure 3:
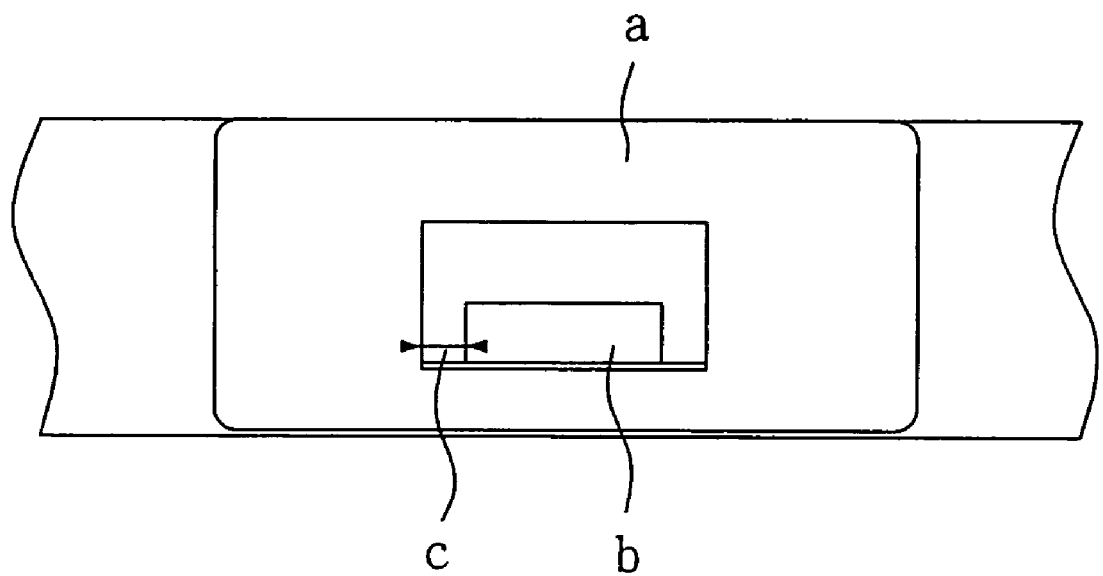
FIG. 3 is a schematic view showing the engagement between the upper frame and the lower frame in the prior art.
Figure 4:
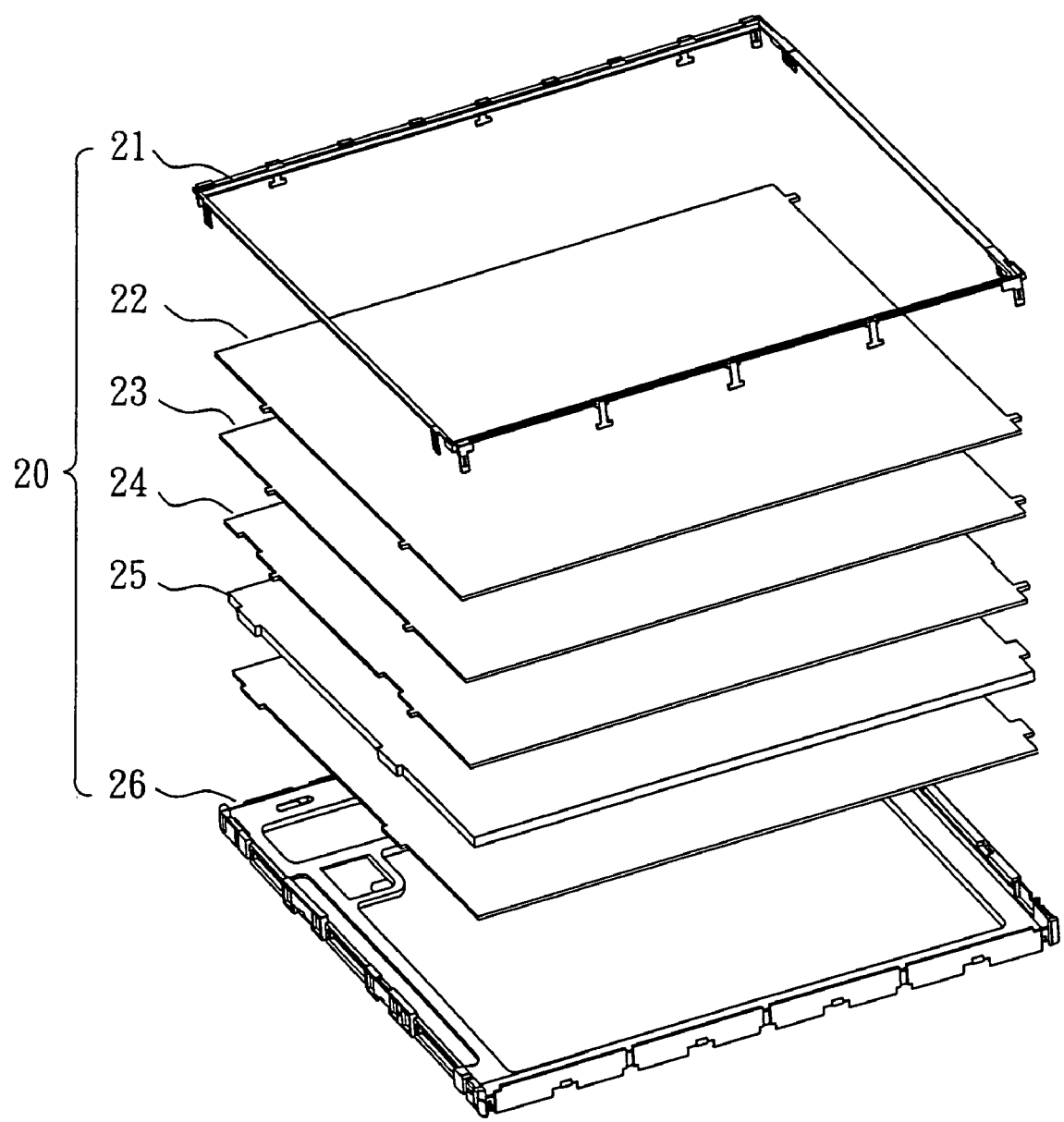
FIG. 4 is a perspective view showing the components of the backlight module of the present invention.
Figure 5:
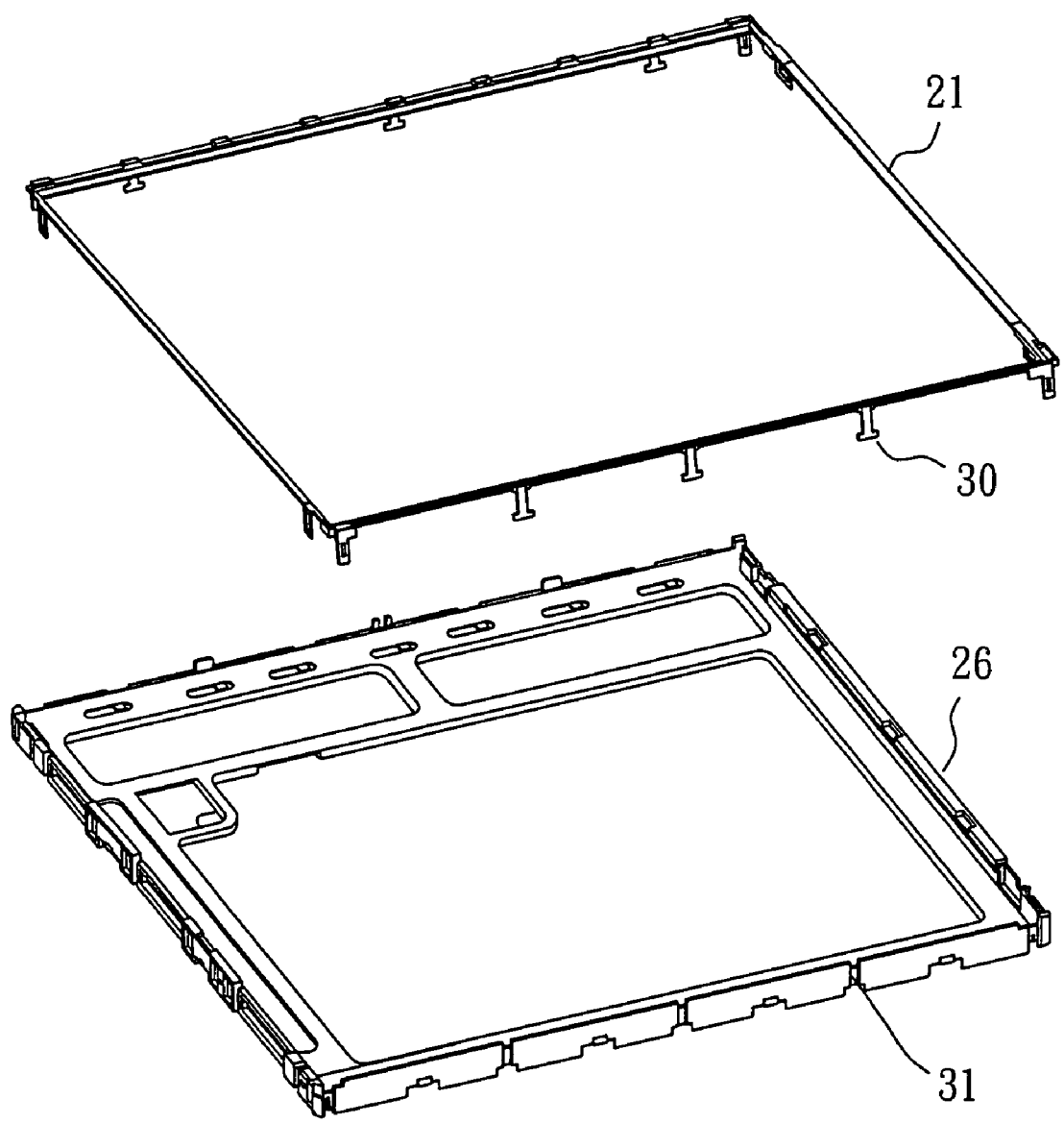
FIG. 5 is a perspective view showing the upper frame and the lower frame of the present invention.

With reference to FIG. 4, there is shown a perspective view of the backlight module according to the present invention. The backlight module 20 is mainly composed of a plastic upper frame 21, an upper diffusing plate 22, a prism plate 23, a lower diffusing plate 24, a light guide 25, a light source device, and a lower frame 26 made of metal or plastic. The upper frame 21 and the lower frame 26 are used to assemble all the components into a unity. As for the assembling method, please refer to FIG. 5 which is a perspective view showing the upper frame and the lower frame of one preferred embodiment of the present invention. At the periphery of the upper frame 21, there is a plurality of T shape hooks 30, which correspond to the grooves 31 formed at the periphery of the lower frame 26. Through the engagement between the T shape hooks 30 and the grooves 31, all the components of the backlight module are well assembled, precisely positioned, and firmly fixed.

Figure 6:
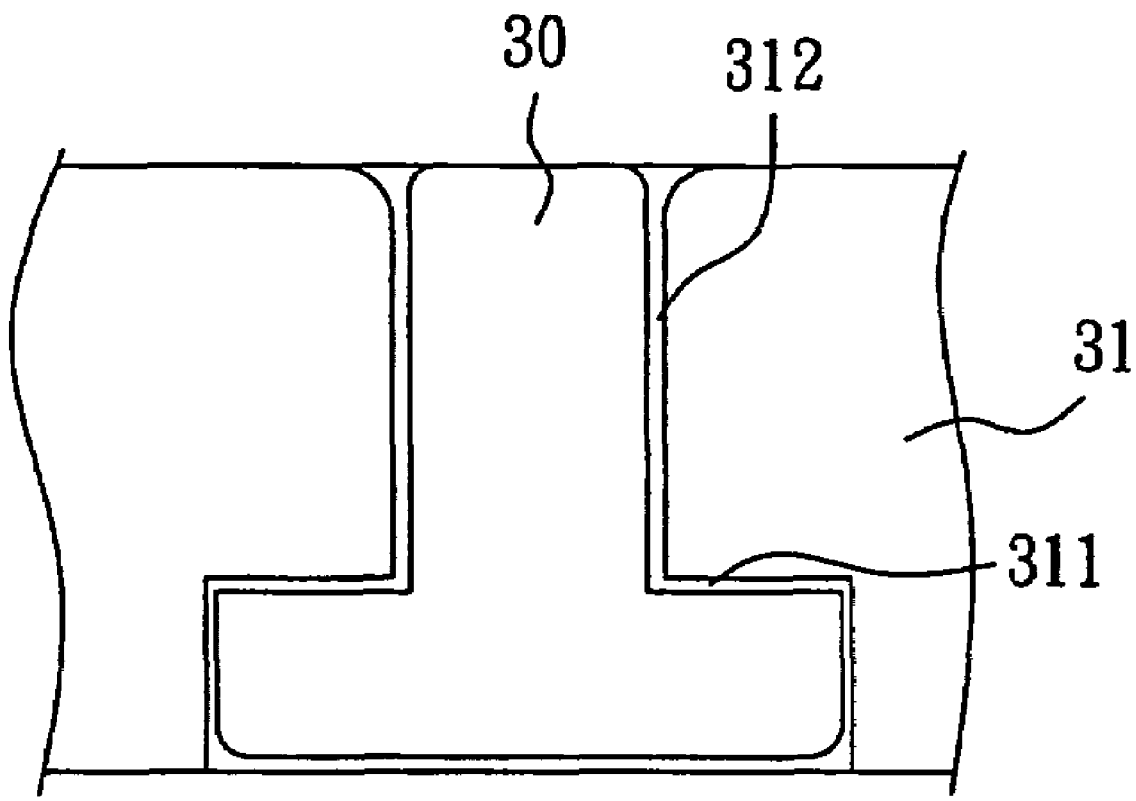
FIG. 6 is a schematic view showing the engagement between the T shape hook and the groove of the present invention.

FIG. 6 is a schematic view showing the engagement between the T shape hook 30 and the groove 31 of the present invention. The T shape hook 30 of the upper frame can easily engage with the groove 31 of the lower frame. Moreover, the space between the T shape hook 30 and the groove 31 is narrower than that of prior arts, and thus its fixing efficacy is high. Compared with the traditional protrusion or square buckling element that can only restrain movement in an upright direction, the frame structure of the present invention even restrains movement in the cross direction.

The T shape hook of the upper frame combined with the groove of the lower frame can provide not only upright direction fixing, but also cross direction fixing, and thereby can precisely position all the components of the backlight module. Furthermore, owing to the highly precise positioning capability, fewer hooking elements are required in the present invention than in the prior arts. Therefore, the weight of the frames of the present invention is decreased due to fewer hooking elements mounted thereon. Also, the structures of the molds that produce the frames are simpler than before, and the cost for making the molds is thus reduced. Moreover, the temperature and speed of injection molding for manufacturing the frames can be controlled with ease in the practical production. As a result, the yield of the frame processing is increased, and the manufacturing cost thereof is reduced.

Example 2

Figure 7:
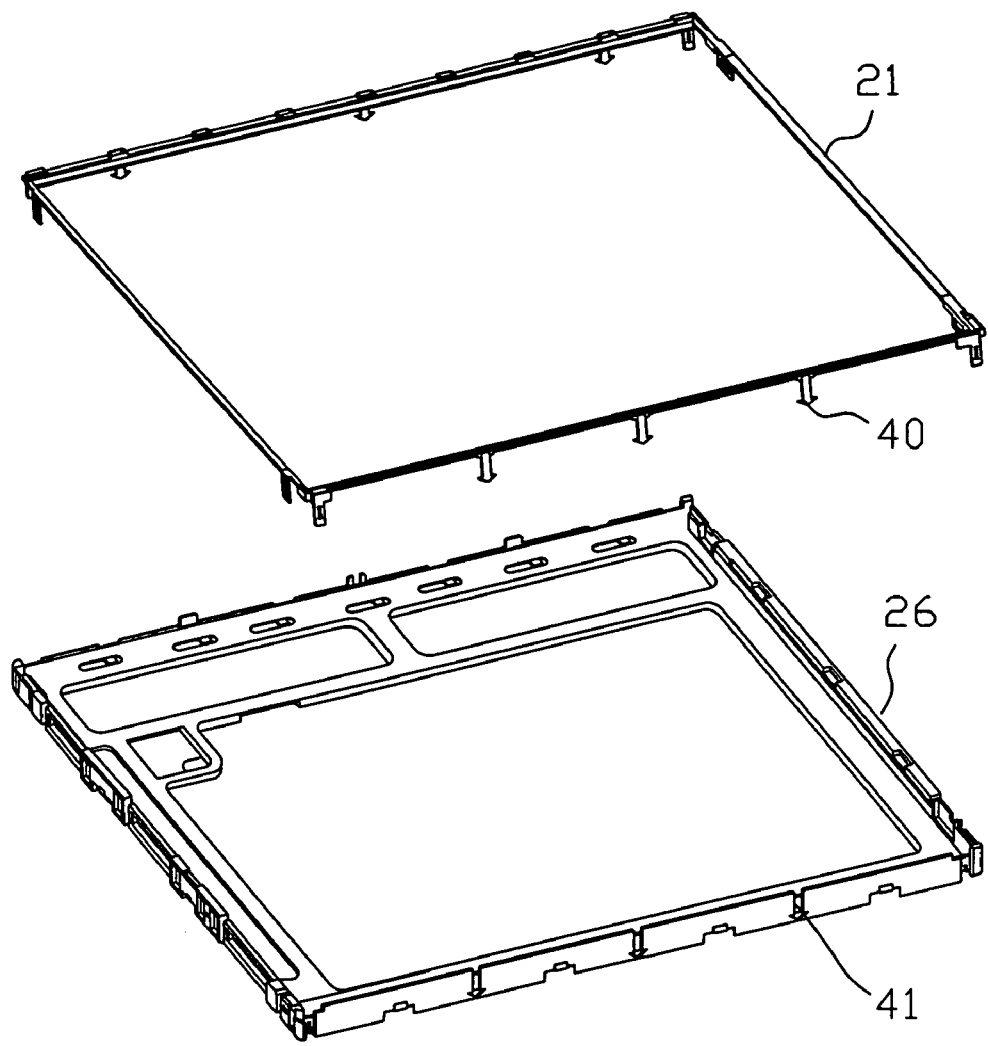
FIG. 7 is a perspective view showing the upper frame and the lower frame of the present invention.

FIG. 7 is a perspective view showing the upper frame and the lower frame of one preferred embodiment of the present invention. At the periphery of the upper frame 21, there is a plurality of arrowheaded shape hooks 40, which correspond to the grooves 41 formed at the periphery of the lower frame 26. Through the engagement between the arrowheaded shape hooks 40 and the grooves 41, all the components of the backlight module are well assembled, precisely positioned, and firmly fixed.

Figure 8:
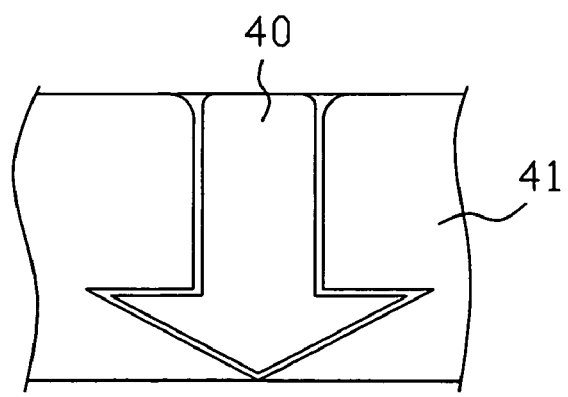
FIG. 8 is a schematic view showing the engagement between the arrowheaded shape hook and the groove of the present invention.

FIG. 8 is a schematic view showing the engagement between the arrowheaded shape hook 40 and the groove 41 of the present invention. The arrowheaded shape hook 40 of the upper frame can easily engage with the groove 41 of the lower frame. Moreover, the space between the arrowheaded shape hook 40 and the groove 41 is narrower than that of prior arts, and thus its fixing efficacy is high. Compared with the traditional protrusion or square buckling element that can only restrain movement in an upright direction, the frame structure of the present invention even restrains movement in the cross direction.

The arrowheaded shape hook of the upper frame combined with the groove of the lower frame can provide not only upright direction fixing, but also cross direction fixing, and thereby can precisely position all the components of the backlight module. Furthermore, owing to the highly precise positioning capability, fewer hooking elements are required in the present invention than in the prior arts. Therefore, the weight of the frames of the present invention is decreased due to fewer hooking elements mounted thereon. Also, the structures of the molds that produce the frames are simpler than before, and the cost for making the molds is thus reduced. Moreover, the temperature and speed of injection molding for manufacturing the frames can be controlled with ease in the practical production. As a result, the yield of the frame processing is increased, and the manufacturing cost thereof is reduced.

Example 3

Figure 9:
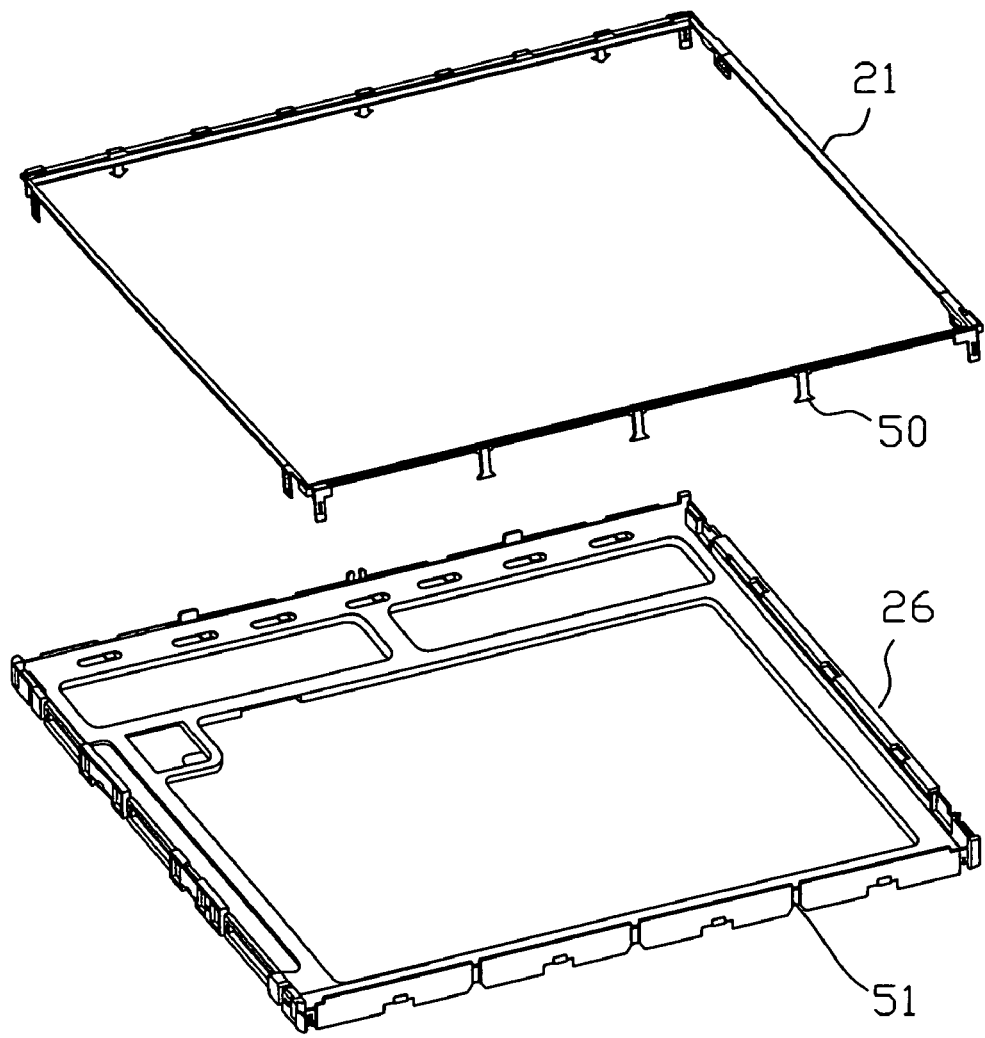
FIG. 9 is a perspective view showing the upper frame and the lower frame of the present invention.

FIG. 9 is a perspective view showing the upper frame and the lower frame of still another preferred embodiment of the present invention. At the periphery of the upper frame 21, there is a plurality of Y shape hooks 50, which correspond to the grooves 51 formed at the periphery of the lower frame 26. Through the engagement between the Y shape hooks 50 and the grooves 51, all the components of the backlight module are well assembled, precisely positioned, and firmly fixed.

Figure 10:
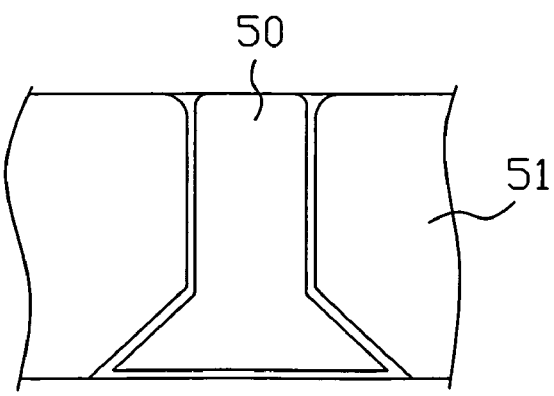
FIG. 10 is a schematic view showing the engagement between the Y shape hook and the groove of the present invention.

FIG. 10 is a schematic view showing the engagement between the Y shape hook 50 and the groove 51 of the present invention. The Y shape hook 50 of the upper frame can easily engage with the groove 51 of the lower frame. Moreover, the space between the Y shape hook 50 and the groove 51 is narrower than that of prior arts, and thus its fixing efficacy is high. Compared with the traditional protrusion or square buckling element that can only restrain movement in an upright direction, the frame structure of the present invention even restrains movement in the cross direction.

The Y shape hook of the upper frame combined with the groove of the lower frame can provide not only upright direction fixing, but also cross direction fixing, and thereby can precisely position all the components of the backlight module. Furthermore, owing to the highly precise positioning capability, fewer hooking elements are required in the present invention than in the prior arts. Therefore, the weight of the frames of the present invention is decreased due to fewer hooking elements mounted thereon. Also, the structures of the molds that produce the frames are simpler than before, and the cost for making the molds is thus reduced. Moreover, the temperature and speed of injection molding for manufacturing the frames can be controlled with ease in the practical production. As a result, the yield of the frame processing is increased, and the manufacturing cost thereof is reduced.

In summary, the frame structure used in a backlight module of the present invention has at least the advantages described below:

1. The present invention has a better fixing efficacy than the prior arts, and thus can fix all the components of the backlight module firmly; and 2. The manufacturing cost of the frames of the present invention is less than that of the prior arts.

Although the present invention has been explained in relation to its preferred embodiment, it is to be understood that many other possible modifications and variations can be made without departing from the spirit and scope of the invention as hereinafter claimed.

What is claimed is:

1. A frame structure used in a backlight module comprising:
   a lower frame for holding components of the backlight module; and
   an upper frame mounted on the lower frame for assembling the components of the backlight module;
   wherein the upper frame has at least one hooking element, which restrains the movements of the components of the backlight module in both cross and upright directions simultaneously; the at least one hooking element is a Y shape hook located at a periphery of the upper frame; and the lower frame has at least one corresponding engaging element that can engage with at least one hooking element.

2. The frame structure as claimed in claim 1, wherein at least one engaging element corresponding to the Y shape hook is a Y shape groove.

3. A frame structure used in a backlight module comprising:
   a lower frame for holding components of the backlight module; and
   an upper frame mounted on the lower frame for assembling the components of the backlight module;
   wherein the upper frame has at least one hooking element, which restrains the movements of the components of the backlight module in both cross and upright directions simultaneously; the at least one hooking element is an arrowheaded shape hook located at a periphery of the upper frame; and the lower frame has at least one corresponding engaging element that can engage with at least one hooking element.

4. The frame structure as claimed in claim 3, wherein at least one engaging element corresponding to the arrowheaded shape hook is an arrowheaded shape groove.

* * * * *